April 17, 1951        W. J. RUSSELL        2,549,243
PRESSURE COOKER CLOSURE FASTENER
Filed Jan. 19, 1946        2 Sheets-Sheet 1
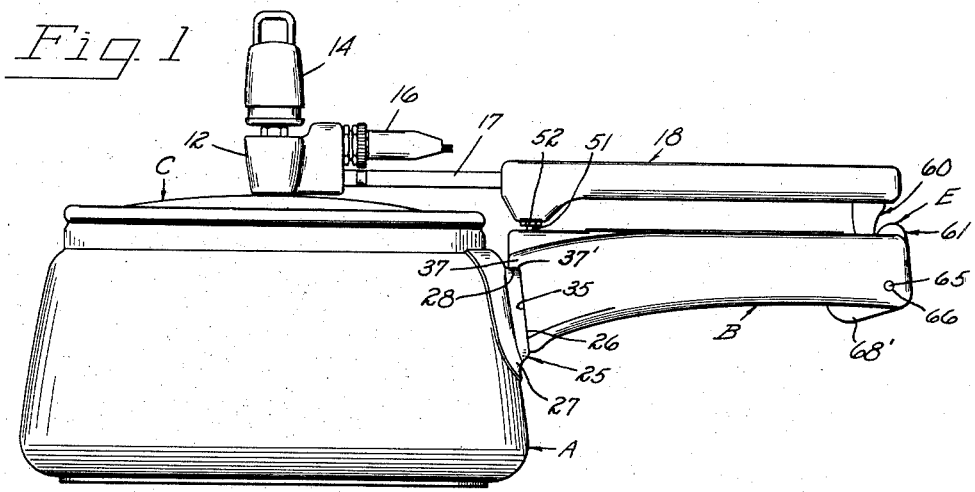
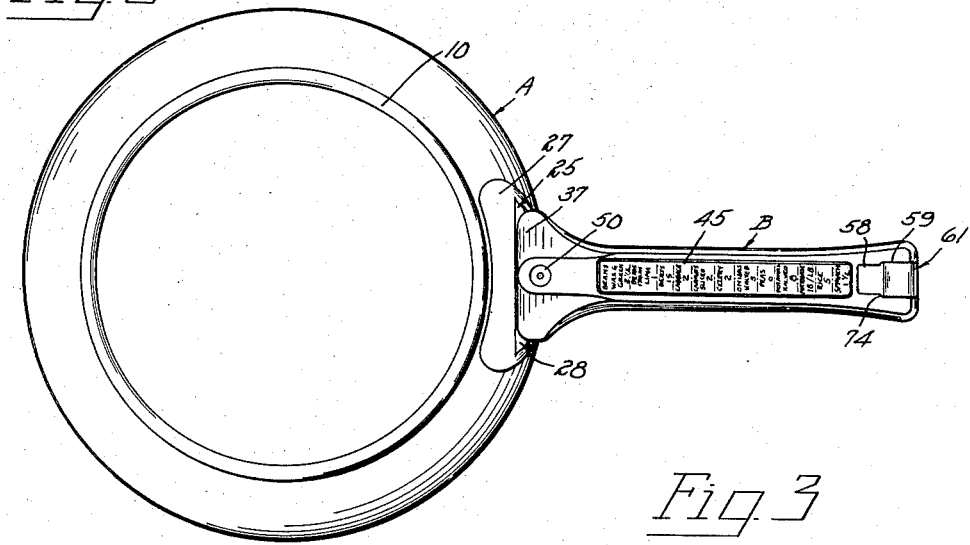
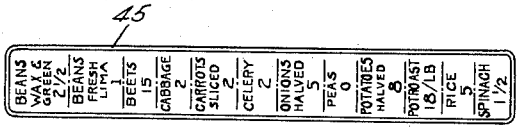
Inventor
WILLIAM J. RUSSELL
By W. Clay Lindsey
Attorney

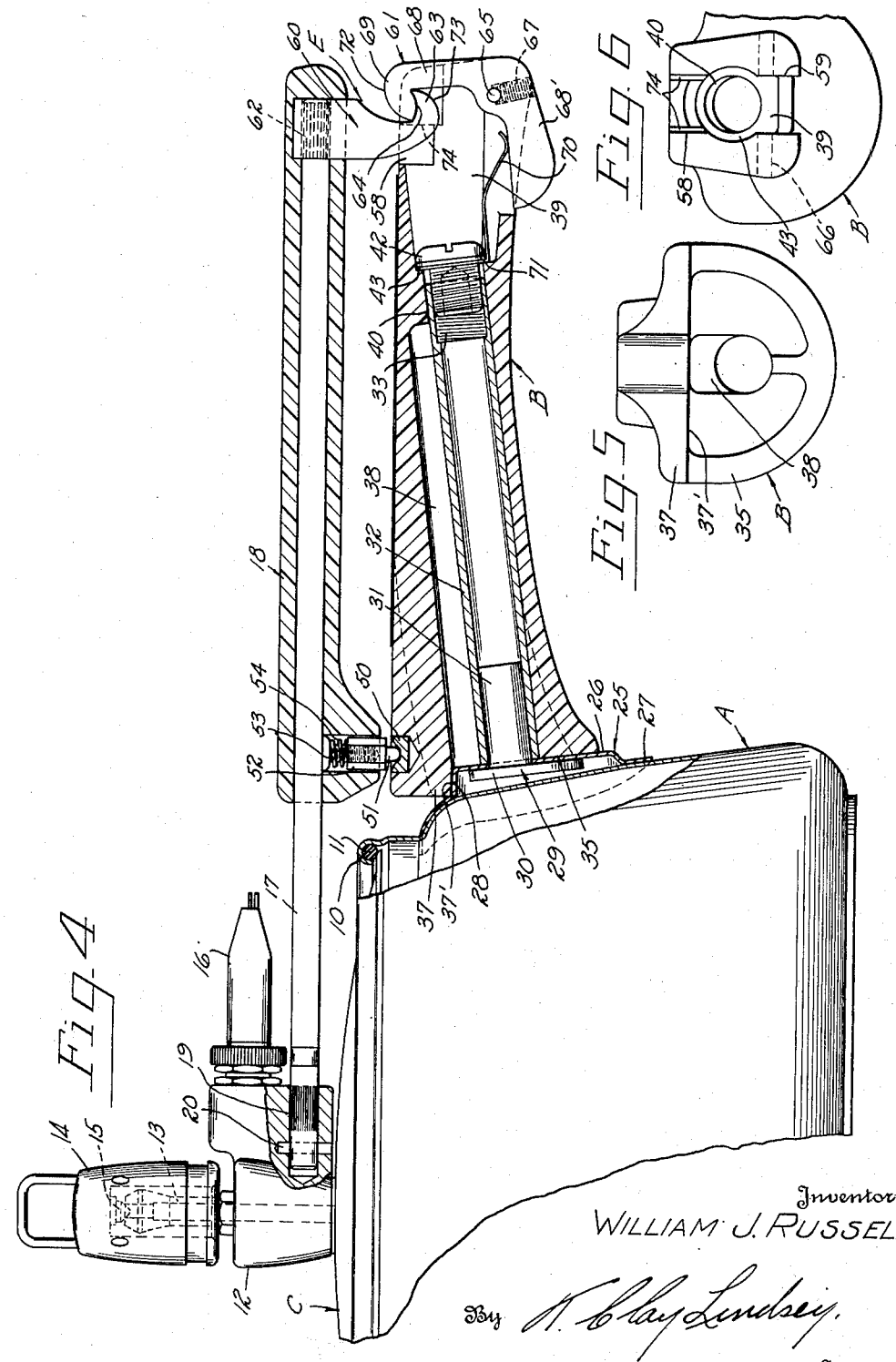

Patented Apr. 17, 1951

2,549,243

UNITED STATES PATENT OFFICE 2,549,243

PRESSURE COOKER CLOSURE FASTENER

William J. Russell, Newington, Conn., assignor to Landers, Frary & Clark, New Britain, Conn., a corporation of Connecticut Application January 19, 1946, Serial No. 642,356

6 Claims. (Cl. 220—25)

This invention relates to pressure cookers and particularly to pressure cookers of the type having an opening provided about its edge with an internal, downwardly facing seat and a cover arranged to be inserted into and removed through said opening and adapted to seal adjacent its margin against said seat. The present invention is particularly concerned with the means for securing the cover in place and with the handle arrangements provided on the vessel and cover.

An aim of the invention is to provide a pressure cooker with improved and simplified securing means whereby the cover may be very easily latched into and unlatched from sealing position within the vessel.

A more particular aim of the invention is to provide a pressure cooker with means for securing the cover in position with respect to the vessel, the arrangement being such that, by the use of only one hand, the cover may be positioned in the vessel and latched in place preliminary to the cooking operation and just as easily and conveniently unlatched and removed from place after the cooking operation is completed and the pressure within the vessel has fallen to a negligible amount.

A further aim of the invention is to provide an improved and simplified handle for the vessel, and means for securely and firmly attaching the same to the vessel.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

In the accompanying drawings, wherein is shown, for illustrative purposes, one embodiment which the present invention may take:

Figure 1 is a side elevational view of the pressure cooker;

Fig. 2 is a top view of the vessel;

Fig. 3 is a top view of a time table;

Fig. 4 is a view similar to Fig. 1 but showing the handles in vertical longitudinal section;

Fig. 5 is a front end view of the handle B for the vessel or container; and

Fig. 6 is a view looking at the outer end of the handle B.

Referring to the drawings in detail, A denotes a vessel or container which may be formed of stainless steel or other suitable material. The vessel A is provided with a handle B, the construction of which will be described more in detail hereinafter. The vessel is provided in its top with an opening, the edge of which is curled or beaded, as at 10, so as to accommodate a gasket 11 which constitutes an internal, downwardly-facing seat against which the marginal portion of a cover C is adapted to seal. The opening in the vessel and the cover are so constructed and arranged that the cover may be inserted through the opening and then be brought up to sealing position against the gasket 11. For illustrative purposes, in the present instance the opening in the vessel is shown as being circular, and the cover may comprise a steel plate having internal stresses which cause the cover to assume a parti-cylindrical shape in cross section and an elliptical form in plan view when it is free to do so so that the cover may be inserted into and withdrawn from the vessel through the opening thereof. In such instance, as is well understood in the art, the cover assumes a circular shape, generally like the surface of a parti-spherical member when it is drawn upwardly against the seat or gasket 11 by applying upward pressure to the central portion of the cover. Connected centrally to the cover is a fitting or head 12 which carries a vent tube 13 on which is positioned a weight 14 having a valve head 15, these parts being shown somewhat conventionally as the particular construction thereof forms no part of the present invention. It is understood that the arrangement is such that, when the pressure within the vessel reaches a predetermined degree, it will raise the weight, thus permitting escape of vapor, and then, when the pressure falls, the valve head again closes the vent through the vent tube. Also secured to the fitting is a pressure indicating gauge 16 which may be of any suitable sort.

Secured to the fitting is a radially extending handle bar 17 about which is molded a plastic hand grip 18. The handle bar comprises a square steel rod hardened and tempered so that it is relatively stiff but somewhat resilient. The forward end of the bar is knurled, as at 19, and has a drive fit in a bore in the fitting. It is further secured in place by a dowel pin 20. The bar is fulcrumed between its ends, as later described, and provided between the outer ends of the handles for the vessel and the cover is a latching arrangement E.

Referring now to the handle B and the means for securing it in place, there is secured, as by means of projection welding, to the side of the vessel a sheet metal bracket 25 having a boss portion 26 and a flange 27, the latter being so conformed as to fit against the side of the vessel. The top wall 28 of the boss is flat and horizontally disposed so as to provide an upwardly facing shoulder. The numeral 29 designates a brace member having a circular head 30 engaging against the inner face of the boss and a cylindrical portion or shank 31 projecting outwardly through an opening provided in the vertical wall of the boss 26. The head may be secured to the vertical wall of the boss by projection welding, for example. Fitting about the shank 31, and spot welded thereto, is a hollow tube 32, the outer end of which is internally threaded as at 33. The handle B is preferably formed of plastic and has, at its forward end, a flat face 35 abutting against the vertical wall of the boss 26. The handle B, at its forward upper end, has a forwardly extending projection or rib 37 the under side of which provides a flat shoulder 37' adapted to overlie and engage the shoulder provided by the top wall 28 of the bracket so that the handle is supported at its forward end upon the bracket and is prevented from rotation relative thereto. The handle B has an opening extending longitudinally therethrough. This opening comprises a hole 38 at the forward end of the handle, a chamber 39 in the rear end of the handle, and a round bore 40 between the hole and the chamber. The hole is somewhat shorter than the tube 32 so that, when the handle is in place, the outer end of the tube will extend into and closely fit within the bore 40. The vertical dimension of the hole 38 is somewhat larger than the diameter of the tube but the tube fits in the bottom portion of the hole. The plastic handle B is secured in place on the tube 32 and against the bracket 25 by a screw 42 the threaded stem of which is screwed into the threaded portion 33 provided in the outer end of the hollow tube 32. The head of the screw bears against a shoulder or stop 43 located at the outer end of the bore 40.

It will be seen from the foregoing description, taken in connection with the drawings, that the arrangement for securing the handle B in place is of very simple character and yet provides a very rigid and strong structure. The handle is very securely held in place against longitudinal movement by the screw 42, and it is prevented from rotation due to the engagement of the rib or projection 37 against the top wall 28 of the bracket 25. The screw can be tightened up so as to force the forward face 35 of the handle against the opposing wall of the bracket.

Provided on the upper flat face of the handle B is a longitudinally extending time table 45 for indicating, preferably in minutes, the cooking time of various foods such as beans, beets, etc.

As previously stated, when the cover is latched in place, the handle bar is fulcrumed between its ends. In the present illustrative disclosure, there is provided, adjacent the forward end of the handle and in the upper face thereof, a socket 50 in which engages the lower end of a pivot stud 51 formed integrally with a nut 52 which is threaded on a screw 53 depending from, and preferably welded to, the under side of the handle bar 17. Between the head of the screw 53 and the upper end of the nut 52 is a coiled spring 54 which serves the purpose of preventing accidental rotation of the nut. With this arrangement, the pivot stud may be easily adjusted by turning the nut so that, when the handles are latched together, the handle bar is flexed to such an extent that the cover is properly held up against its seat provided by the gasket 11.

Referring now to the latching arrangement E between the handles, there is provided on the outer end of the handle bar 17 a keeper or hook 60, and provided in the outer end of the handle B is a cooperating pivoted latch member 61. The outer end of the handle bar is knurled, as at 62, and the keeper has a drive fit on this knurled portion. The keeper extends downwardly through the plastic hand grip 18 and has at its lower end a rearwardly extending hook portion 63 the upper edge 64 of which is concavely curved as illustrated. The rear end of the handle B is vertically slotted, as at 58 and 59, so as to accommodate the latch 61. The latch is in the form of a generally right-angled piece pivoted between its ends on a transverse pin 65 the ends of which extend into bores 66 provided in the handle B to opposite sides of the slot 59 therein. In order to prevent displacement of the pin, a set screw 67 is provided. The upper end of the upwardly extending arm 68 of the latch has a forwardly extending hook portion 69 the under side of which is convexly curved so as to engage the curved edge 64 of the hook 60 in such manner that accidental disengagement of the latch is prevented. The other arm 68' of the latch extends forwardly of the pivot 65 and projects down beneath the under side of the handle B. The latch is normally urged into latching position by a leaf spring 70 bearing against the upper edge of the arm 68'. In the present instance, this spring has a round eye portion 71 through which the threaded stem of the screw 42 extends. This eye portion is clamped by the screw between the head thereof and the shoulder or step 43. The upper end of the arm 68 and the lower end of the hook member 60 are convexly curved, as at 72 and 73 respectively, so as to provide cams whereby, when the hand grip 18 is forced down towards the position shown, the latch is cammed out and then, when the grip 18 is brought to its final position, the latch will automatically move into the latching position shown. The slot 58 has, between its ends, rearwardly facing shoulders 74 against which the forward end of the hook portion 69 of the latch engages when the keeper is not in place.

It will be seen that, with the latching arrangement disclosed, when it is desired to position the cover in place, the cover is passed through the opening in the vessel and then the handle bar is swung down to engage the pivot stud in the socket and, on continued downward movement of the handle bar, the handle bar is flexed somewhat and the hook 69 is automatically engaged with the latch. These operations may be carried out by one hand of the operator. The latch having been engaged, the cover is securely held in place until the latch is intentionally released. When it is desired to remove the cover, it is merely necessary for the operator to place the palm of one hand upon the handle grip 18 and his fingers under the handle B and then, while squeezing the handles towards each other, raise, by one of his fingers, the arm 68' of the latch so as to swing the latch out of latching position.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a pressure cooker of the type comprising a vessel having an opening provided adjacent its margin with a downwardly facing seat, a handle secured to the side wall of said vessel and extending radially therefrom, a cover adapted to be inserted into said vessel through said opening and to seal against said seat, a resilient bar attached to said cover adjacent the central portion thereof and extending radially therefrom, and latching means on the outer ends of said handle and bar for securing the cover in place, the combination therewith of adjustable fulcruming means for adjustably fulcruming the bar on the handle and spaced therefrom comprising a socket carried by said handle adjacent the forward end thereof, a threaded screw secured to said bar and depending therefrom, a nut on said screw and having a pivot stud engaging in said socket, and a spring about said screw and bearing on the top of said nut for preventing accidental rotation thereof.

2. In a pressure cooker of the type comprising a vessel having an opening provided adjacent its margin with a downwardly facing seat and a cover adapted to be inserted into said vessel through said opening and to seal against said seat, the combination therewith of means for holding the cover in seated position comprising a resilient bar attached to the cover adjacent the central portion thereof and extending radially therefrom, a handle secured to the side wall of said vessel and extending radially therefrom, said handle being formed with a vertical slot in its outer end, means between the ends of said bar for fulcruming the same on said handle with the bar spaced from and generally parallel to the handle, a keeper secured to the outer end of the bar and depending therefrom, said keeper being formed with an outwardly facing hook portion adapted to enter the upper end of said slot when the bar is flexed toward the handle, and a latch member pivotally mounted in said slot having an upwardly extending arm provided with an inwardly facing hook portion adapted to engage with the hook portion of the keeper and having an actuating arm for releasing the latch member extending along the lower end of the slot whereby the bar may be flexed and the latch member may be actuated in a single handed operation.

3. A device as set forth in claim 2 in which the hook portions of the keeper and the latch member are provided with interengaging faces which are respectively concavely and convexly curved so as to prevent accidental disengagement.

4. In a pressure cooker of the type comprising a vessel having an opening provided adjacent its margin with a downwardly facing seat and a cover adapted to be inserted into said vessel through said opening and to seal against said seat, the combination therewith of means for holding the cover in seated position comprising a resilient bar attached to the cover adjacent the central portion thereof and extending radially therefrom, a handle secured to the side wall of said vessel and extending radially therefrom, said handle being formed with a vertical slot in its outer end, means between the ends of said bar for fulcruming the same on said handle with the bar spaced from and generally parallel to the handle, a keeper secured to the outer end of the bar and depending therefrom, said keeper being formed with an outwardly facing hook portion adapted to enter the upper end of said slot when the bar is flexed toward the handle, and a latch member pivotally mounted in said slot comprising an L-shaped member of substantially the same thickness as the slot and including an upwardly extending arm substantially closing the outer end of the slot, said arm being provided at its upper extremity with an inwardly facing hook portion adapted to engage with the hook portion of the keeper, and including an actuating arm extending along the lower end of the slot and protruding therefrom when the latch member is engaged with the keeper, whereby the bar may be flexed and the latch member may be actuated in a single handed operation.

5. In a pressure cooker of the type comprising a vessel having an opening provided adjacent its margin with a downwardly facing seat and a cover adapted to be inserted into said vessel through said opening and to seal against said seat, the combination therewith of means for holding the cover in seated position comprising a resilient bar attached to the cover adjacent the central portion thereof and extending radially therefrom, a handle secured to the side wall of said vessel and extending radially therefrom, said handle being formed with a vertical slot in its outer end containing a vertically extending shoulder, means between the ends of said bar for fulcruming the same on said handle with the bar spaced from and generally parallel to the handle, a keeper secured to the outer end of the bar and depending therefrom, said keeper being formed with an outwardly facing hook portion adapted to enter the upper end of said slot when the bar is flexed toward the handle, a latch member pivotally mounted in said slot and having an upwardly extending arm provided with a hook portion engageable with said hook portion of said keeper, the end of said hook portion of said latch member being engageable with said shoulder to limit movement of said latch member to latching position, said latch member having an actuating arm for releasing the latch member extending along the lower end of the slot whereby the bar may be flexed and the latch member may be actuated in a single handed operation, and a spring urging said latch member into latching position.

6. In a pressure cooker of the type comprising a vessel having an opening provided adjacent its margin with a downwardly facing seat and a cover adapted to be inserted into said vessel through said opening and to seal against said seat, the combination therewith of means for holding the cover in seated position comprising a resilient bar attached to the cover adjacent the central portion thereof and extending radially therefrom, a tube secured to said vessel and extending radially therefrom and having an internal thread on its outer end, a hollow handle about said tube having a shoulder spaced rearwardly of the outer end of the tube and a vertical slot in its outer end, means between the ends of said bar for fulcruming the same on same handle with the bar spaced from and generally parallel to the handle, a keeper secured to the outer end of the bar and depending therefrom, said keeper being formed with an outwardly facing hook portion adapted to enter the upper end of said slot when the bar is flexed toward the handle, a latch member pivotally mounted in said slot having an upwardly extending arm provided with an inwardly facing hook portion adapted to engage with the hook portion of the keeper and having an actuating arm for releasing the latch member extending along the lower end of the slot whereby the bar may be flexed and the latch member may be actuated in a single handed operation, a screw threaded into said tube for holding said handle in place thereon, and a leaf spring bearing upon said actuating arm of the latch member and normally urging the same into latching position, said spring having an eye portion about said screw engaged between the head of said screw and said shoulder.

WILLIAM J. RUSSELL.

REFERENCES CITED

The following references are of record in the file of this patent:

UNITED STATES PATENTS

| Number | Name | Date |
|---|---|---|
| 1,500,163 | Tate | July 8, 1924 |
| 1,662,316 | Leustig et al. | Mar. 13, 1928 |
| 2,282,011 | Vischer, Jr. | May 5, 1942 |
| 2,317,349 | Wolfers | Apr. 27, 1943 |

FOREIGN PATENTS

| Number | Country | Date |
|---|---|---|
| 33,108 | France | Feb. 14, 1928 |
| 406,811 | Great Britain | Mar. 8, 1934 |